(12) United States Patent
Slater (10) Patent No.: US 7,551,519 B2
(45) Date of Patent: Jun. 23, 2009

(54) PASSIVE LONG RANGE ACOUSTIC SENSOR

(76) Inventor: Dan Slater, 1352 Dorothea Rd., La Habra Heights, CA (US) 90631

( * ) Notice: Subject to any disclaimer, the term of this patent is extended or adjusted under 35 U.S.C. 154(b) by 81 days.

(21) Appl. No.: 11/644,374

(22) Filed: Dec. 21, 2006

(65) Prior Publication Data

US 2008/0151694 A1    Jun. 26, 2008

(51) Int. Cl.
H04R 1/20 (2006.01)
(52) U.S. Cl. .................................................... 367/178
(58) Field of Classification Search ............... 367/149, 367/140, 135, 136; 356/4.01–5.15; 359/399–426
See application file for complete search history.

(56) References Cited

U.S. PATENT DOCUMENTS

| | | | |
|---|---|---|---|
| 235,199 A | 12/1880 | Bell | |
| 235,496 A | 12/1880 | Bell et al. | |
| 241,909 A | 5/1881 | Bell et al. | |
| 3,657,547 A * | 4/1972 | Mansfield | 250/208.3 |
| 4,421,985 A * | 12/1983 | Billingsley et al. | 250/353 |
| 4,443,757 A * | 4/1984 | Bui | 324/76.29 |
| 5,389,790 A * | 2/1995 | Honey et al. | 250/342 |
| 5,940,519 A * | 8/1999 | Kuo | 381/71.11 |
| 6,034,760 A * | 3/2000 | Rees | 356/28.5 |
| 6,731,570 B1 * | 5/2004 | Langdon | 367/149 |
| 2004/0252587 A1 * | 12/2004 | Melese et al. | 367/149 |
| 2008/0135762 A1 * | 6/2008 | Villanucci et al. | 250/340 |

OTHER PUBLICATIONS

Graf, Calvin. "Exploring Light, Radio & Sound Energy". (Tab Books, ISBN# 0-8306-0758-7, © 1985), Chapt.7 "SolarCells".

* cited by examiner

Primary Examiner—Dan Pihulic
(74) Attorney, Agent, or Firm—Robert N. Schlesinger (57) ABSTRACT

This Passive Long Range Acoustical Sensor relates to means of sensing acoustical sources and signals, including multi-channel acoustical signals, such as various types of sounds, vibrations, flutter, turbulence, and the like, and at long distances through a natural optical channel, without the use of a laser or other artificial illuminating means. A modified multi-channel embodiment of the Passive Long Range Acoustical Sensor may use a combination of natural optical channels and active illumination means, such as laser or other artificial illuminating means, of producing additional optical channels.

20 Claims, 9 Drawing Sheets

Fig. 9

PASSIVE LONG RANGE ACOUSTIC SENSOR

FIELD OF INVENTION

This Passive Long Range Acoustical Sensor relates to means of sensing acoustical sources (5) and signals, including multi-channel acoustical signals, such as various types of sounds, vibrations, flutter, turbulence, and the like, and at long distances through a natural remote optical receiver link (6), without the use of a laser or other artificial illuminating means. A modified multi-channel embodiment of the Active/Passive Long Range Acoustical Sensor may use a combination of natural remote optical receiver links (6) from solar illumination and active illumination means (1), such as laser (14), spotlight (15) or other artificial illuminating means (1), of producing additional remote optical receiver links (6).

SUMMARY OF THE INVENTION

This Passive Long Range Acoustic Sensor is a new and useful device using variations and significant improvements of the theoretical basis of the photophone, invented by Alexander Graham Bell and Sumner Tainter during the early 1880's. The invention disclosed herein, and its several embodiments use naturally formed, acousto-optical modulators to convert nearby sounds into modulated light and an optical communications channel. This is used to establish long range optical communications links to a remotely located observer. This system enables the observer to effectively hear and analyze acoustical and vibrational signals in close proximity to the distant object serving as the acousto-optical modulator. Stereophonic and multi-channel embodiments further extend the listening, analytic, and beam forming capability of this invention. This Passive Long Range Acoustic Sensor also has applications disclosed below that are new and useful, and would not be viable using prior art technology.

The simplest embodiment of an operating Passive Long Range Acoustic Sensor uses an acousto-optical modulator (3) with a glint (8) (a bright specular reflection) to produce modulated light and a remote optical receiver link (6) for local acoustical sources (5) and signals. Throughout this specification, and its appended claims, the terms specular reflection, specular, and glint (8) are to be interpreted as synonymous terms, with the term glint being preferred and more widely used throughout this specification. The simple embodiments of the Sensor (7) are comprised essentially of a telescopic Passive Long Range Acoustic Sensor with an amplifier and special filter incorporated into the signal processing circuit, to extract useful signals from the remote optical receiver link (6). The multi-channel embodiments of the Passive Long Range Acoustic Sensor is comprised essentially of a telescope (9), a plurality of photosensitive elements (10) or a photosensitive element (10) capable of multi-channel detection and located on the focal plane of the telescope (9), an amplifier system (11) to increase the signal levels, and an audio filter system (12) to reduce atmospheric optical turbulence noise, and other undesirable noise, all incorporated into the signal processing circuit, to extract useful signals from the remote optical receiver link (6). Further signal processing means, depicted in FIG. 6 and in some other drawing figures as a computer (13), may optionally be added to the Sensor (7) embodiments to extract further information and a recording means (19) and listening means (18), such as headphones, may also be added to the Sensor (7) embodiments. More advanced real time and post acquisition signal processing, and particularly with the multi-channel embodiments of the Sensor (7), can provide significant benefits in signal detection and analysis, and beam forming. Signal analysis, depicted throughout some of the drawing figures as a computer (13), may include such spectral analysis of the acoustical signals for target identification and the measurement of vibrational phenomena, such as flutter and turbulence, associated with the target. Signal analysis may also include Doppler shift analysis to determine target velocity, acceleration, and deceleration, and their variances. More complicated embodiments of the invention, including various modified and hybrid embodiments are disclosed throughout this specification.

BACKGROUND OF THE INVENTION

Alexander Graham Bell and Sumner Tainter were granted three patents during 1880 and 1881, on a wireless communication device they called the photophone. See: U.S. Pat. No. 235,199 (Bell, 1880) for "Apparatus for Signaling and Communication, Called Photophone"; U.S. Pat. No. 235,496 (Bell & Tainter, 1880) for "Photophone Transmitter"; and U.S. Pat. No. 241,909 (Bell & Tainter, 1881) for "Photophone Receiver". The Bell-Tainter photophone transmitter ('496) consisted of an acoustically modulated diaphragm mirror that reflected solar illumination toward an optical receiver several hundred feet away. The Bell-Tainter photophone receiver ('909) was a selenium photocell mounted at the focal plane of a parabolic reflector. The selenium photocell was connected to a set of headphones. The sender would adjust the transmitter mirror to position the solar reflection onto the receiver's photocell. The Bell-Tainter device ('496) was able to transmit crude and noisy acoustical signals along an optical communication path up to 213 m (700 ft). The photophone was largely forgotten by the scientific and engineering communities shortly after their invention, and after Bell redirected his inventive energies to his inventions relating to flight. More recently, Calvin R. Graf briefly describes a simple photophone in part of a chapter of his 1985 book entitled "Exploring light, radio & sound energy" (Blue Ridge Summit, Pa.: TAB Books; ISBN # 0-8306-0758-7). The photophone described by Graf was modified to use natural acouto-optical modulators, and would only function over relatively short distances, as with the Bell-Tainter photophone, because the Graf and the Bell-Tainter photophones did not describe or anticipate the filtering means needed for suppressing optical turbulence noise that results from long distance optical propagation in the atmosphere and they did not describe or anticipate the stereophonic and multichannel sensor systems disclosed and claimed in the present Passive Long Range Acoustic Sensor invention.

Other prior art that is only tangentially related, but worthy of mention includes laser microphones, and laser vibrometers. Parabolic microphones are also tangentially related because they are used to listen to acoustical sounds and signals over distances up to a few hundred meters or so, depending upon distinction of signal and interfering acoustical noise. Parabolic microphones operate using significantly different principles, and do not utilize an optical channel. Laser microphones and their related laser vibrometers actively transmit laser radiation to an acousto-optical modulator, and are thereby detectable and have other limitations, such as limitations in range and atmospheric conditions. The advantages of the Passive Long Range Acoustic Sensor include:
1. Passive, non cooperative, and covert operation;
2. Portability of system and ease of transporting to line-of-sight for necessary remote optical receiver link (6) between acousto-optical modulator (3) and its glints (8), and the Sensor (7) receiver system;

3. Low power operation;
4. Very long range operation that has been demonstrated in remote listening tests at 40+ kilometer (25 mile) distances;
5. Very long range acoustic and vibration measurements are possible, including target acoustical signature, airflow turbulence, target kinematics, and scene geometry;
6. Stereophonic and multi-channel operation capabilities, including beam-forming applications;
7. Use of signal processing techniques and filters to enhance detection and analysis of otherwise difficult to obtain signals.
8. Compact and portable system size for some embodiments of the system;
9. Relatively low manufacturing cost and maintenance cost of the simple embodiments of the system; and
10. Relative easy of use of the simple embodiments of the system A significant new and useful improvement of the prior art photophone, with the advantages listed above, and adapted for many more applications and for long range acoustical sensing and analysis is the Passive Long Range Acoustic Sensor disclosed herein. The Passive Long Range Acoustic Sensor is essentially a non-coherent tristatic (triple link) optical vibrometer, capable of long range acoustic sensing. This tristatic system uses distant naturally occurring acousto-optical modulators (3), possessing glints (bright specular reflections) (8), to establish a set of long range optical receiver links (6) to the Passive Long Range Acoustic Sensor. Acousto-optical modulators (3) are functioning as optical elements capable of acoustic modulation. Examples of naturally formed, non cooperative reflective acousto-optical modulators (3) include building windows, curved vehicle windshields and shiny metal surfaces such as vehicle bodies, aircraft fuselages, storage tanks, and the like. Acoustic sources (5) near the acousto-optical modulators (3) cause weak mechanical deformations of the acousto-optical modulator's (3) membrane or surface. When properly illuminated by the sun or other intense light sources (1), acousto-optical modulators (3) cause bright glints (8) that are optically observable at large distances from a remote optical receiver link (6), with a telescope or the like. An audio signal (5) can be recovered from the observed glint by detecting the weak intensity fluctuations using a photodetector at the focal plane of a telescope, telescopic lens, or the like, and this signal may then be filtered and processed to yield desired acoustic signals and information. This new and useful technique provides very long range remote acoustic sensing with operation demonstrated by the inventor over 40 kilometer (25 mile) terrestrial links. Remote acoustic sensing from orbital distances is also likely possible, and provides a variety of aerospace and satellite diagnostic applications. Remote acoustic sensing is both passive and covert, and therefore has may be applied to sense regions that may be inaccessible or without previously installed transmission links.

The Passive Long Range Acoustic Sensor requires three separate links to function effectively. These three links are the optical illumination link (2) from the optical illumination source (1) (the sun) to the acousto-optic modulator (3), the acoustic source link (4) from the acoustic source (5) to the acousto-optical modulator (3), and the remote optical receiver link (6) from the acousto-optical modulator (3) to the remote Sensor (7). As such, a simple embodiment of the Sensor system is dependent upon the target solar aspect and its specular reflective properties. This disadvantage may, however, be overcome with use of more advanced detectors and the use of non solar, non cooperative, or artificial illumination means for one or more of the optical illumination links (2), thereby creating a hybrid embodiment of the present invention, as disclosed below and shown in FIG. 7. Another means of overcoming the aforementioned disadvantage is to optimize the geometry and material vibrational characteristics of the acousto-optical modulator (3), or to utilize an acousto-optical modulator (3) mounted onto the object to be sensed or monitored as desired. The second disadvantage related to this tristatic link requirement is the relatively low acoustic sensitivity, generally requiring relatively loud acoustic sources (5) such as horns, public address systems, crowds, vehicles and engines. Naturally occurring acousto-optical modulators (3) generally have a poor acoustic to optical modulation conversion efficiency. Furthermore, atmospheric scintillation introduces significant noise into the remote optical receiver link (6) between the acousto-optical modulator (3) and the remote optical receiver, i.e., the Passive Long Range Acoustic Sensor (7). Relatively loud acoustic sources (5) such as sirens, motors, trains, aircraft, gunshots, public address systems, playgrounds and crowds, have been detected and analyzed by the inventor, from distances as far as 40 or more kilometers, but simple embodiments of the Passive Long Range Acoustic Sensor requires loud acoustic sources (5). Acoustic sensitivity may, however, be increased by using more advanced hardware, improved signal processing techniques, and multi-channel Sensor acoustic beam forming techniques, applied to modified embodiments of the present invention.

Although there is the disadvantage of the Passive Long Range Acoustic Sensor requiring these three simultaneous and separate high quality links (2, 4, 6) to function effectively, the potential countermeasures described above, and the advantages and valuable applications of the Passive Long Range Acoustic Sensor outweigh the illumination and communication linkage problems.

Heretofore, the means used for remote acoustical sensing include parabolic microphones and laser microphones. These two means have certain advantages and limitations. Parabolic microphones have a relatively short range, and although laser microphones have a longer range than parabolic microphones, their range is short in comparison to the present Passive Long Range Acoustic Sensor. Some of the most significant limitations and disadvantages associated with these means includes but is not limited to their limited range, noise interference, power requirements for laser microphones, and laser microphones' use of the artificial and non-covert illumination means of a laser to activate an acousto-optical modulator (3). Another set of practical limitations and disadvantages are the fact that the prior art laser microphone acousto-optical sensing means requires more equipment, more costly equipment, more set-up and assembly time, more training to operate, safety issues related to the use of lasers, and the larger size and less mobility of the equipment. The simple embodiments and some modified embodiments of the Passive Long Range Acoustic Sensor are portable and mobile, and are able to be aligned to acquire a direct line-of-sight to an acousto-optical modulator (3) and its associated glint (8) or to a set of acousto-optical modulators (3) and their set of glints (8), for use with multi-channel embodiments of the Passive Long Range Acoustic Sensor.

In trying to solve these disadvantages and problems with diverse contemporary remote acoustic sensing technology, the inventor, Dan Slater, devised, invented and design engineered, the present new and useful Passive Long Range Acoustic Sensor and a set of derivative embodiments.

There are a number of new and useful applications for the Passive Long Range Acoustic Sensor described herein, and that would not be viable applications using the prior art technologies. These applications include, but are not limited to: very long range acoustic sensing, listening, and analysis, beam forming with multi-channel embodiments, and very long range vibration and turbulent airflow sensing and analysis. Analysis may include, for example, identification of the signal, diagnostics, and data gathering. More specifically, such long range listening applications may include detection, identification, and analysis of vehicles, vibrations and flutter, explosions, gunshots, public address systems, crowds and other loud acoustic sources (5). Acoustic source localization is possible when multiple remote optical receiver links (6) with audio channels are simultaneously received. This technique may be used to localize the very remote location of a gunshot or other loud acoustical source (5). Acoustic beam forming using multiple remote optical receiver links (6) with audio channels can be used to improve the sensitivity and suppress and filter unwanted acoustic interference. Another significant advantage of the present Sensor (7) system is that it allows the user to extract audio from video or high frame rate electronic or film camera imagery for simultaneous visual and aural sensing.

More specifically, the long range turbulent airflow sensing applications include detection, identification, and analysis of atmospheric turbulence, vehicle traffic and turbulence, building maintenance devices such as vent fans, and other air flow sources. Additional applications of the Passive Long Range Acoustic Sensor may be found in the fields of meteorology, aerodynamics, traffic engineering, public safety and rescue operations, remote sensing and exploration, and entertainment in the visual arts and music. The detection and analysis of building vent fans and ventilation flows may be found through the new and useful analysis of acoustic signatures of their leakage and turbulent airflow. The meteorological applications include new and useful means of measuring and analyzing winds and turbulence. The aerodynamic applications include new and useful means of measuring and analyzing aircraft and rocket vibration and flutter, flows and wake turbulence. The traffic engineering applications include new and useful means of detecting and analyzing vehicles and multiple vehicle detection, signatures, and characterization from their wake turbulence signatures, and their velocity, acceleration, deceleration, and deviation through, for example, their Doppler shift. The public safety and rescue applications include new and useful means of detecting and analyzing audio signals over a very long distance and the passive detection of distressed persons or vehicles, including terrestrial vehicles, ships or aircraft, and covert persons and vehicles, through strobes or the like, fitted with acousto-optical modulators (3), or through the use of a small, stationary acousto-optical modulator (3) aimed toward a known Sensor (7). The remote sensing and exploration applications include new and useful means of remote sensing of areas that may be inaccessible or inconvenient to visit, and remote exploration of planetary bodies with acousto-optic modulators (3) such as shiny balloons or the like, and with other specular objects. The visual arts and music applications include new and useful means of introducing new, useful and unusual varieties of sounds or active interaction into a performance or recording, or a new set of themes into science fiction screen play.

It should be noted that a direct line of sight from the Passive Long Range Acoustic Sensor to a vehicle or acoustical source is not required. The line of sight is to the glint (8) or set of glints (8), which is the source of the remote optical receiver links (6), which carry the acoustical sources (5), whether they be loud sounds or wake turbulence in the local vicinity. Doppler shifts have been detected and analyzed at distances up to 40 kilometers, using the Passive Long Range Acoustic Sensor.

Figure 8:
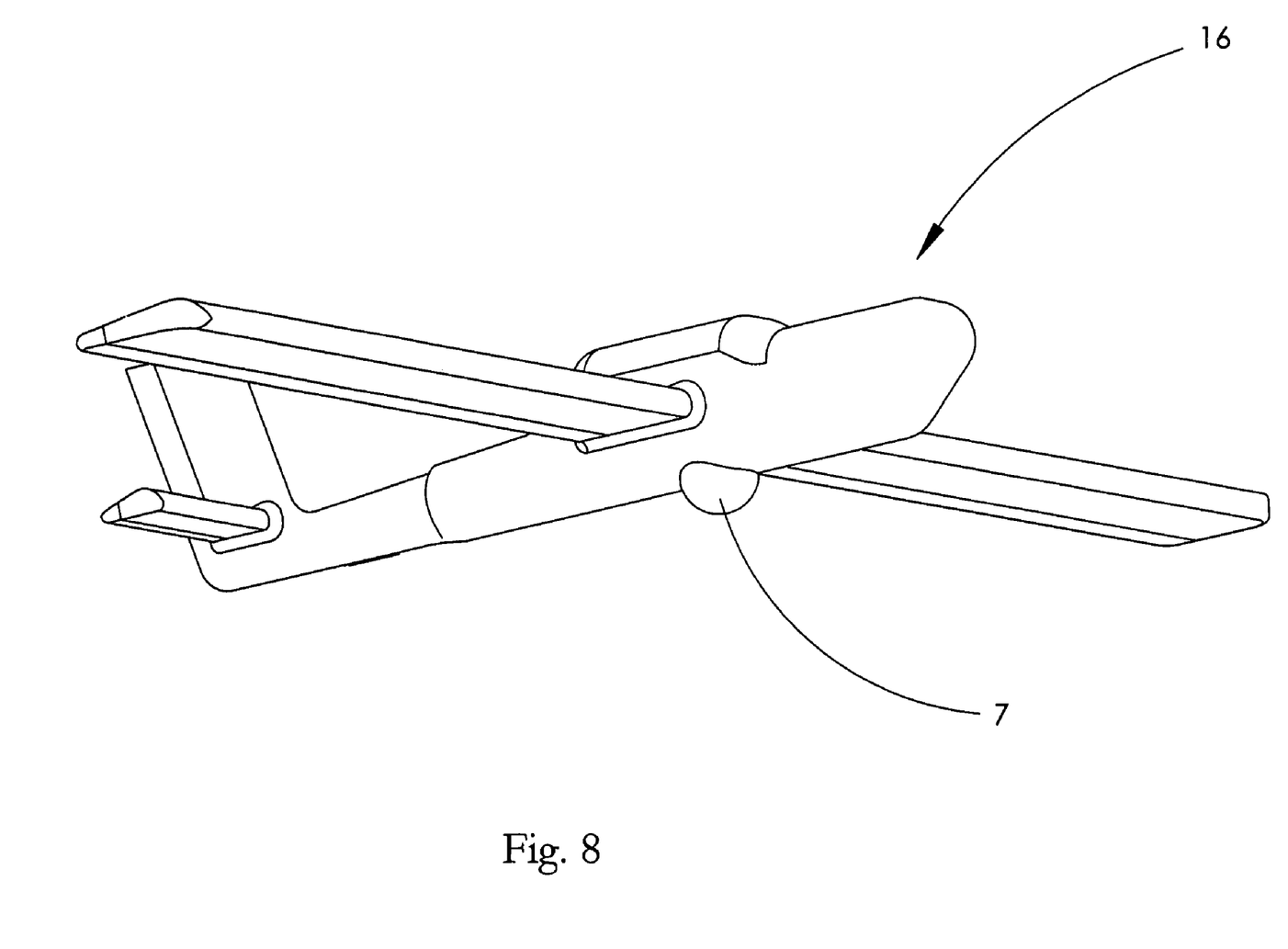
FIG. 8 shows a perspective front view of an unmanned aerial vehicle (16) with a hybrid embodiment of the multi-channel Sensor (7) mounted on its underside.

Observing platforms for the Passive Long Range Acoustic Sensors described herein include stationary and mobile ground-based platforms, as well as stationary and mobile aerial and space-based platforms. The mobile aerial platforms with one or more Passive Long Range Acoustic Sensors may be mounted on observational balloons, unmanned aerial vehicles (UAVs, drones) (16) and helicopters, and airplanes, as shown in FIG. 8. These platform-based Sensors need not be stationary, but may have electromechanical means to be directed at and to follow a glint (8) or set of glints (8). Other embodiments of the Passive Long Range Acoustic Sensor may follow a moving glint (8) or a moving set of glints (8) through the use of a tripod (20) or the like, with an aiming means (21). Throughout this specification and its appended claims, the term tripod (20) is to be broadly construed, and is intended to include any means of supporting the Sensor (7) and the aiming means (21) is also intended to be broadly construed and is intended to also include aiming handgrips and automatic, optically-based electromechanical means of aiming at a glint (8) or set of glints (8), and maintaining aim, including the associated feedback and control systems.

DESCRIPTION OF THE DRAWING FIGURES

The drawing figures reflect selected embodiments of the Passive Long Range Acoustic Sensor, and as intended for use as a stand alone system or as an independent subset of a more advanced or complicated system. The Passive Long Range Acoustic Sensor is not intended to be so limited, however, and it is intended that some embodiments may be incorporated into more extensive or elaborate sensing or surveillance systems.

Referring again to the drawing figures, like reference numerals are used to refer to like or similar specific parts of the Passive Long Range Acoustic Sensor (7), or to the acousto-optical modulators (3), glints (8) and their acoustic sources (5) and links (2, 4, 6), as shown in the various drawing figures, and throughout this specification and its appended claims.

DESCRIPTION OF A SIMPLE EMBODIMENT

Figure 1:
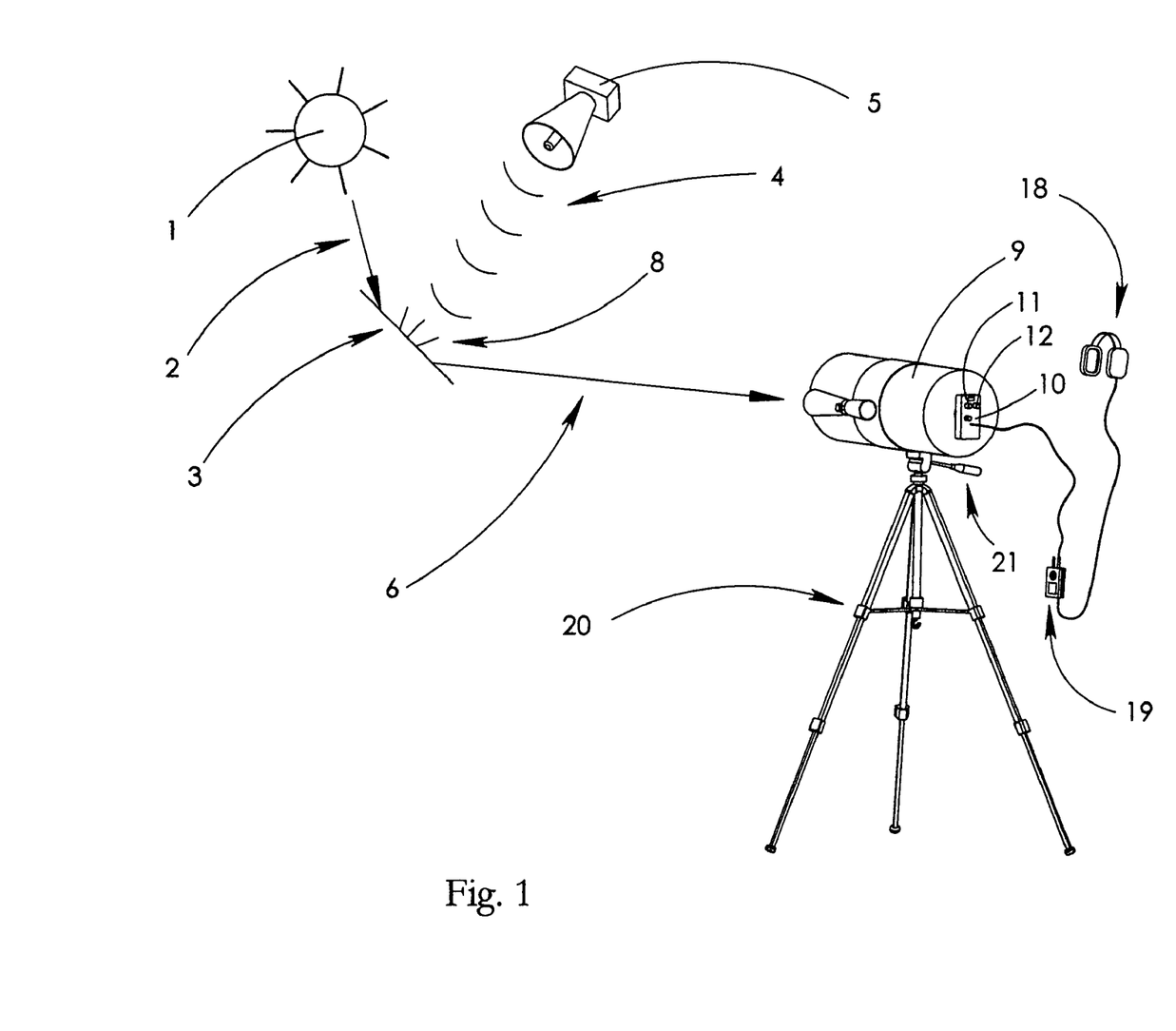
FIG. 1 shows a perspective top view from the rear and left side of a simple embodiment of the Passive Long Range Acoustic Sensor, using a reflector telescope (9) to capture the remote glints (8), and showing the key components of the invention.
Figure 2:
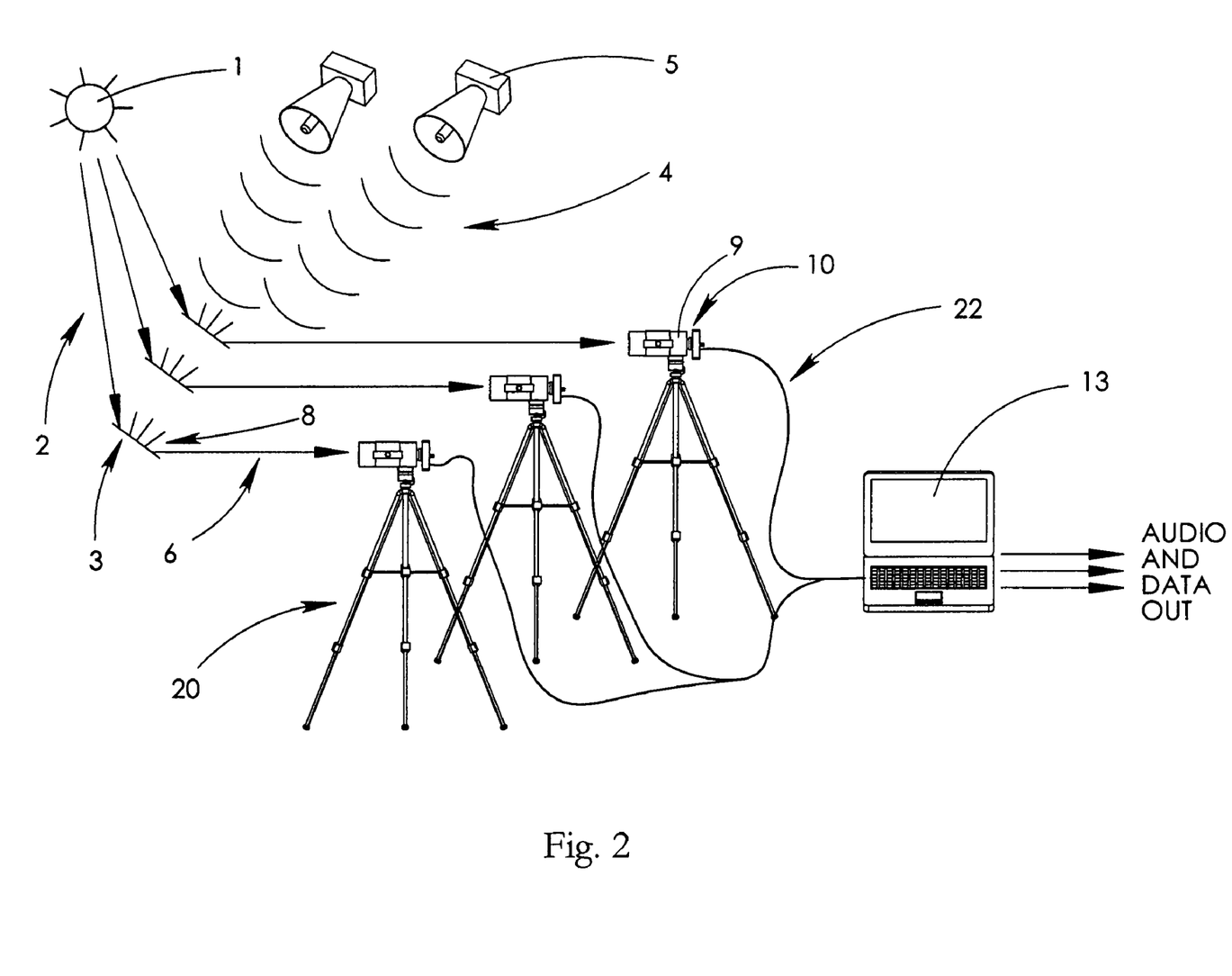
FIG. 2 shows a perspective left side view of a simple multi-channel embodiment of the Passive Long Range Acoustic Sensor, using a set of independent camera telephoto lens (9) to capture remote glints (8), and showing the key components of this portable multi-channel embodiment of the invention.
Figure 3:
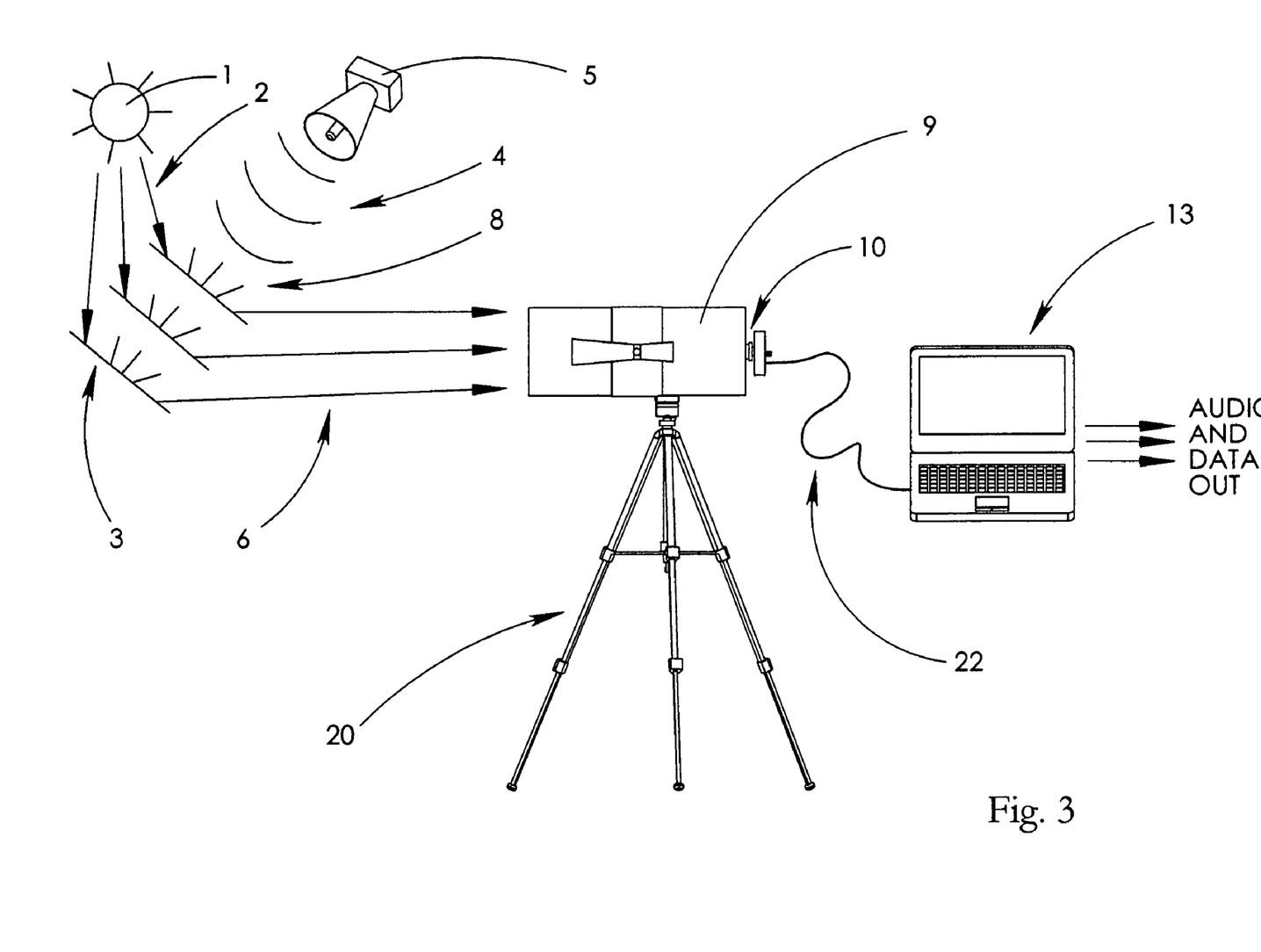
FIG. 3 shows a perspective left side view of a multi-channel embodiment of the Passive Long Range Acoustical Sensor, using a single reflector telescope (9) to capture a set of glints (8), and showing the key components of this multi-channel embodiment of the invention.

A simple embodiment of the Passive Long Range Acoustic Sensor, as shown in FIG. 1, is basically a receiver system and is comprised essentially of a telescope (9), a photosensitive element (10), an amplifier (11), a filter (12), and a listening means (18) or recording means (19), or both said means (18 and 19). The telescope (9) collects the light (6) from a glint (8) associated with a distant acousto-optical modulator (3) and focuses it onto a photosensitive element (10) located on the focal plane of the telescope (9). Throughout this specification and its appended claims, the term photosensitive element (10) is intended to be broadly construed, and is also intended to include one or more photodiodes, photodetectors, photosensors, pixels, or film, or a combination thereof, particularly for some of the multi-channel embodiments of this invention disclosed below. The photosensitive element (10) converts the incident light (6) from the telescope (9) into a weak electrical signal that is then amplified by the amplifier (11), at which point, the signal is filtered by the filter (12) to remove atmospheric noise and other noise. A representative Passive Long Range Acoustic Sensor may be comprised essentially of, for example, an 8 inch aperture Celestron Cassegrain telescope (9), a photosensitive element receiver (10) with an amplifier (11) and an adjustable high pass filter (12) such as a New Focus model 2001 and a listening means (18), such as a set of headphones or the like. Another filter (12) that may be utilized in this simple embodiment and other embodiments, and with a number of advantages, is a three section high pass filter (12) with a break frequency near 300 Hz. Throughout this specification and its appended claims, the term telescope (9) is intended to be broadly construed and intended to also include the set of lens components resulting in an image at the focal plane, an optical system that collects light from an acousto-optical modulator (3), light collectors, and to include such devices as telescopes, telescopic lens, telephoto lens, scopes, and the like. This Sensor (7) system, in its various embodiments, may be used with not only audio sounds that are perceptible to humans, but may also be used for the detection and analysis of subsonic and supersonic sounds that are not within the range of human hearing.

The photosensitive element (10) sees a strong atmospheric optical scintillation signal with an $f^n$ frequency dependence combined with a very weak audio signal. In the simplest Passive Long Range Acoustic Sensor embodiments, the photosensitive element (10) output is AC coupled and high pass filtered (12) to suppress the optical carrier (6) and the low frequency scintillation modulation of the remote optical receiver link (6). Atmospheric optical turbulence causes considerable low frequency noise with an $f^n$ turbulence power spectrum. Appropriate audio filters (12) in terms of their Laplace transform operator s ($s=\sigma+i\omega$ where $\sigma$=exponential decay, $\omega$=angular frequency and $i=\sqrt{-1}$) may have the general form of: $Vo/Vi=s/(s+a)^n$. A single stage 300 Hz high pass filter (12), $s/(s+1885)$ typically improves the signal to noise ratio by 20 dB but a filter (12) with a $s/(s+a)^3$ transfer function with the filter breakpoint (a) near or in the audio passband would cancel much of a typical $f^3$ turbulence power spectrum. Note that for n=1, there are 6 dB per octave high pass filter slope, and for n=2, the slope is 12 dB per octave, and for n=3, the slope is 18 dB per octave. For many applications, the 18 dB per octave high pass filter response rate is preferred. The corner frequency, a, is typically near or in the audio passband. This would result in a frequency independent scintillation power spectral density. This new and useful application of filters (12) are essential to improving the sensitivity of the Passive Long Range Acoustic Sensor, typically reducing such atmospheric optical turbulence noise by 20 to 50 dB.

Figure 9:
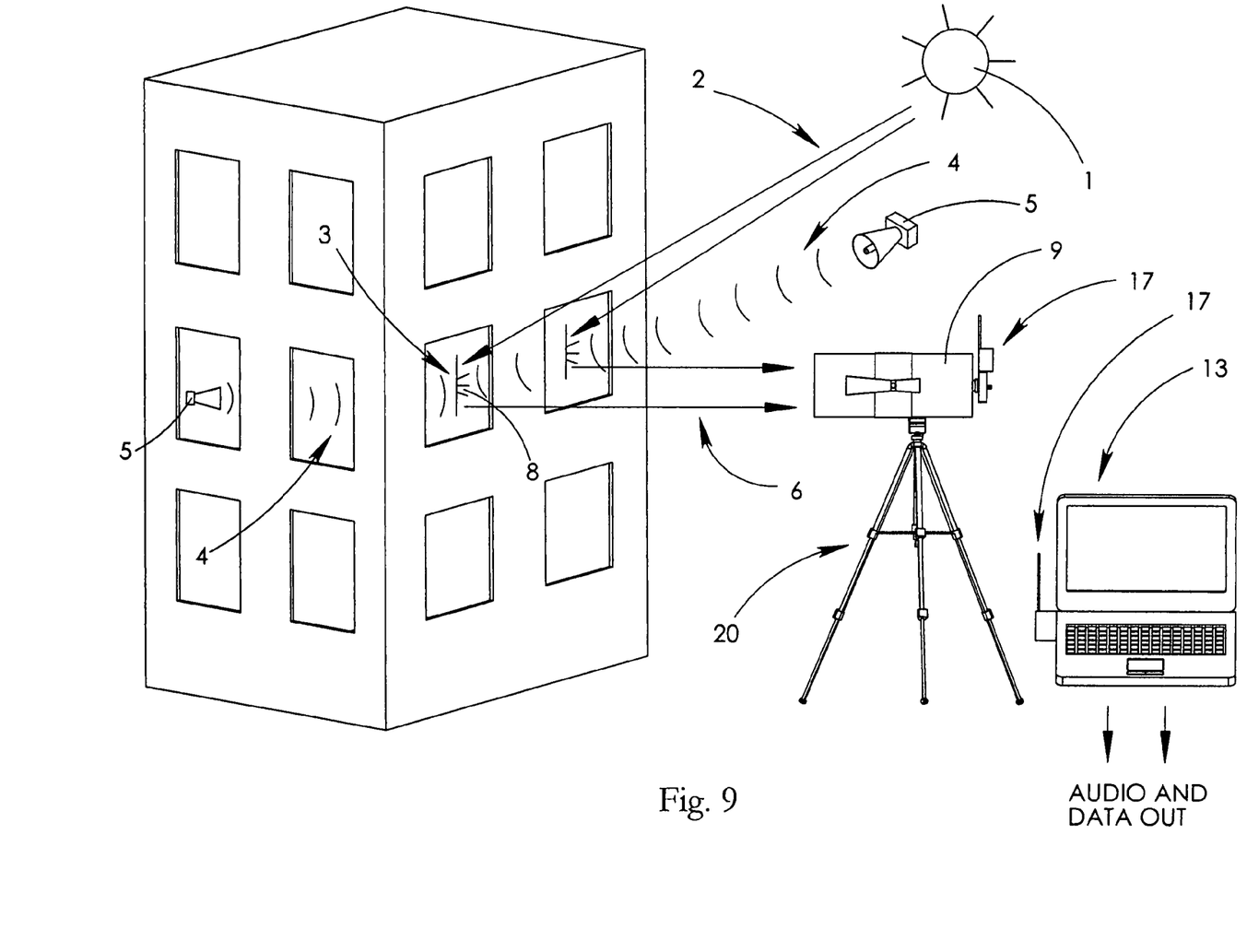
FIG. 9 shows a perspective view of a multi-channel Sensor (7) used to distinguish and analyze an acoustical source (5) inside the building, by subtracting the acoustical sources (5), noise, outside the building.

Throughout this specification and its appended claims, and for each embodiment of the Passive Long Range Acoustic Sensor, there is a communication circuit from the Sensor's (7) photosensitive element (10) to the other components of the Sensor (7), such as an amplifier (11), one or more filters (12), a computer (13) and signal processing means, a listening means (18), and a recording means (19) such as a magnetic tape recording device, an optical recording device, a computer hard drive, or other recording means. Such a communication circuit may be hard-wired with an electrical or optical cable (22), as shown in FIGS. 1-3 and 7, or the like, or through a radio-frequency or microwave transmission means (17), as shown in FIGS. 8 and 9, or a combination of means to affect a circuit thereof.

Description of Modified Simple Embodiments

One problem with the simple embodiment of the Passive Long Range Acoustic Sensor is that the atmospheric optical scintillation randomly modulates the optical carrier level of the remote optical receiver link (6), which causes large gain variations in the receive link (6) when operating over long distances. This is effectively a shimmering effect, and causes strong, high level random amplitude modulation of the received audio signal. This set of modified embodiments of the Passive Long Range Acoustic Sensor reduces this effect and problem by stabilizing the receive link (6) gain using the out of band optical carrier signal as a gain reference.

The atmospheric environment between the acousto-optical modulator (3) and the Passive Long Range Acoustic Sensor, i.e., the receiver, has a significant impact on the overall Sensor's performance. Kolmogorov theory provides a basis for a model of the atmospheric optical turbulence phenomena. Atmospheric wind shear and thermal convection produce large scale laminar flows. Flows with dimensions below the outer scale exceed the critical Reynolds number resulting in a chaotic turbulent flow. The moving air masses transfer kinetic energy by turbulent inertial mixing, producing a self-similar fractal cascade of ever smaller eddies until the inner scale is reached. At this point, the kinetic energy is finally dissipated non-turbulently as heat. The inner scale is typically a few millimeters, and much smaller than the telescope (9) aperture of a Passive Long Range Acoustic Sensor. Chaotically driven turbulent flow occurs within the inertial sub-range between the outer and inner scales. This turbulence causes localized thermal disturbances, which produces corresponding localized air refractivity variations. These random refractivity variations are spatially and temporally distributed creating natural atmospheric optical systems that result in optical scintillation. A measure of the degree of optical refractivity variation is the index of refraction structure constant, $Cn^2$.

Atmospheric turbulence produces strong optical scintillation in the very long distance horizontal optical paths typically used by the Passive Long Range Acoustic Sensor as the remote optical receiver link (6). Optical scintillation results when the turbulent flow produces numerous spatially and temporally distributed swirling chaotic eddies that form a complex, spatially distributed, multi-element and time varying optical system. This time varying multi-element optical system conceptually is a 4 dimensional distribution of moving, irregularly shaped positive and negative lens elements in the atmosphere that form new limiting apertures larger or smaller than the actual telescope (9) aperture of the Passive Long Range Acoustic Sensor. This continuously provides momentary increases and decreases of the irradiance. The scintillation index is a measure of the irradiance fluctuations relative the mean squared irradiance or equivalently, a measure of atmospheric optical conditions that modify the effective aperture of the Sensor's telescope (9) or the like. Optical scintillation introduces noise into the Passive Long Range Acoustic Sensor's remote optical receiver link (6) by rapidly modulating the effective telescope (9) aperture area, which produces rapid log-normal gain variations in the Sensor's receive link (6), rather than by adding noise directly to the link (6). The multiplicative combination within the compound optical system results in the log-normal scintillation irradiance statistics. Unless photon starved, optical scintillation is usually the dominant noise source in the Passive Long Range Acoustic Sensor system.

Atmospheric optical scintillation generally introduces a modified $f^n$ frequency dependent log-normal gain variation into the remote optical receiver link (6) of the Passive Long Range Acoustic Sensor. At low audio and subsonic frequencies, these atmospheric channel gain variations are much larger than the weak desired acoustically induced acousto-optical modulation (3) gain variations. It is important to not only suppress the turbulence noise due to gain modulation of the optical carrier (6), but to also to suppress turbulence gain modulation of the desired audio. An oversized photosensitive element (10) senses the sum of the scintillation degraded signals and any background illumination. In the absence of the background bias illumination, the DC coupled photosensitive element (10) output can be used to normalize the Passive Long Range Acoustic Sensor's receive channel (6) gain by referencing to the optical carrier level outside of the audio spectral region of interest.

These new and useful modified embodiments of the Passive Long Range Acoustic Sensor use the out-of-band optical carrier energy to stabilize the receive link (6) gain. The first set of modified embodiments uses a feedforward filter (12) method for stabilizing the remote optical receiver link (6) gain and to separate the in-band audio signal from the scintillation corrupted carrier using filters (12) and then to divide the in-band audio signal by the out-of-band scintillation corrupted carrier signal (6). See FIG. 4 for an example block diagram for this type of feedforward filter (12) element. The scintillation corrupted gain reference signal is the DC and subsonic signal components from the photosensitive element (10). The in-band signal is normalized (divided) by the remote optical receiver link (6) gain estimate derived from the DC carrier and subsonic signal components. This significantly reduces unwanted amplitude modulation induced by atmospheric turbulence along the line of sight between the Passive Long Range Acoustic Sensor and the glint (8) associated with an acousto-optical modulator (3) or its associated wake turbulence.

An alternate new and useful modified embodiment of the Passive Long Range Acoustic Sensor uses a feedback filter (12) design in which the DC coupled photosensitive element (10) output that is passed through a gain control multiplier. See FIG. 5 for an example block diagram for this type of feedback filter (12) element. The DC level of the gain control multiplier is held at a constant level by an automatic gain control (AGC) loop that drives the multiplier control loop. The AGC bandwidth is from DC to the lower band limit of the desired audio or vibration signal. Background illumination and unwanted amplitude modulation induced by atmospheric turbulence along the line of sight between the Passive Long Range Acoustic Sensor and the glint (8) associated with an acousto-optical modulator (3) or its associated wake turbulence can be at least partially suppressed by such a nonlinear transformation of the gain reference signal.

Atmospheric scintillation causes variance in the intensity of the optical receive link (6). This is a reason for the link gain stabilization feature in the filter (12) design. The feedback link gain stabilization may be achieved with the filter (12) forming an automatic gain controller (AGC). The feedback filter (12) consists of a variable gain amplifier, a low pass filter and a loop filter. The DC coupled photosensitive element (10) output is passed through variable gain amplifier, the low pass filter, the loop filter and then as a control signal to the variable gain amplifier. The variable gain amplifier output is the filter output. This filter (12) stabilizes the receive link gain to reduce atmospheric scintillation noise and signal modulation. Throughout this specification and its appended claims, the term "filter" (12) is intended to typically refer to, but not limited to, a high pass filter (12), and where suitable or desirable, a filter with an optical carrier referenced gain stabilizing architecture, and said architecture may be of the feedback variety or the feedforward variety. Some specialized and hybrid embodiments of the Passive Long Range Acoustic Sensor may utilize a plurality of filters (12), as further discussed below, and said plurality of filters (12) may include both feedback filter (12) architectures, as well as feedforward filter (12) architectures.

The feedforward link gain stabilization may be achieved with the filter (12) normalizing the photosensitive element (10) output by feedforward processing. The DC coupled photosensitive element (10) output is passed through a band splitting filter that separates the audio spectrum of interest from the scintillation modulated optical carrier. Then, the audio spectrum of interest is divided by the scintillation modulated optical carrier. This filter (12) stabilizes the receive link gain to reduce atmospheric scintillation noise and signal modulation. The feedforward filter (12) may include a time delay element to align the gain control signal with the audio signal.

Figure 4:
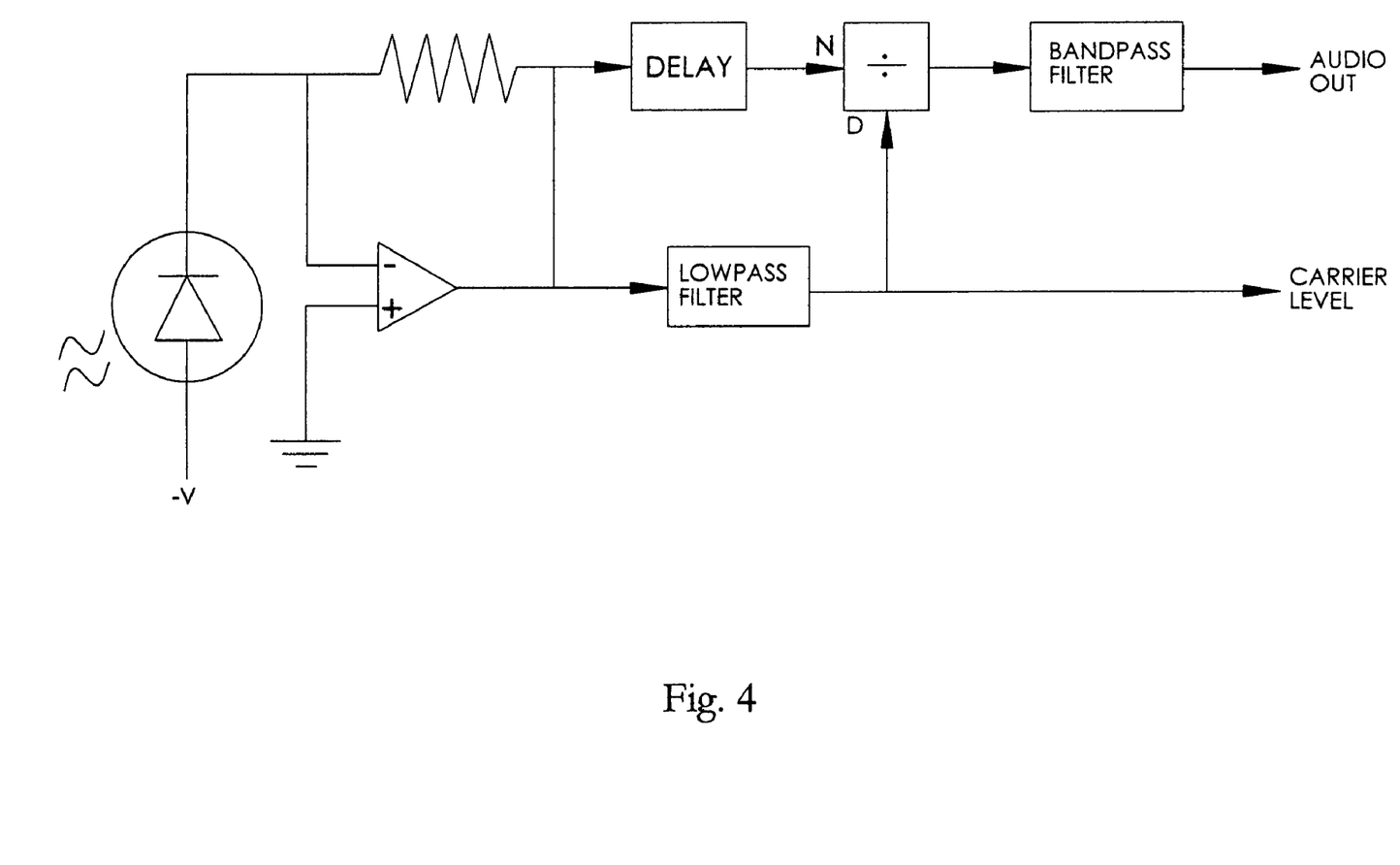
FIG. 4 shows a block diagram of a feedforward turbulence suppression filter (12) that may be used in desired embodiments of the Passive Long Range Acoustic Sensor.
Figure 5:
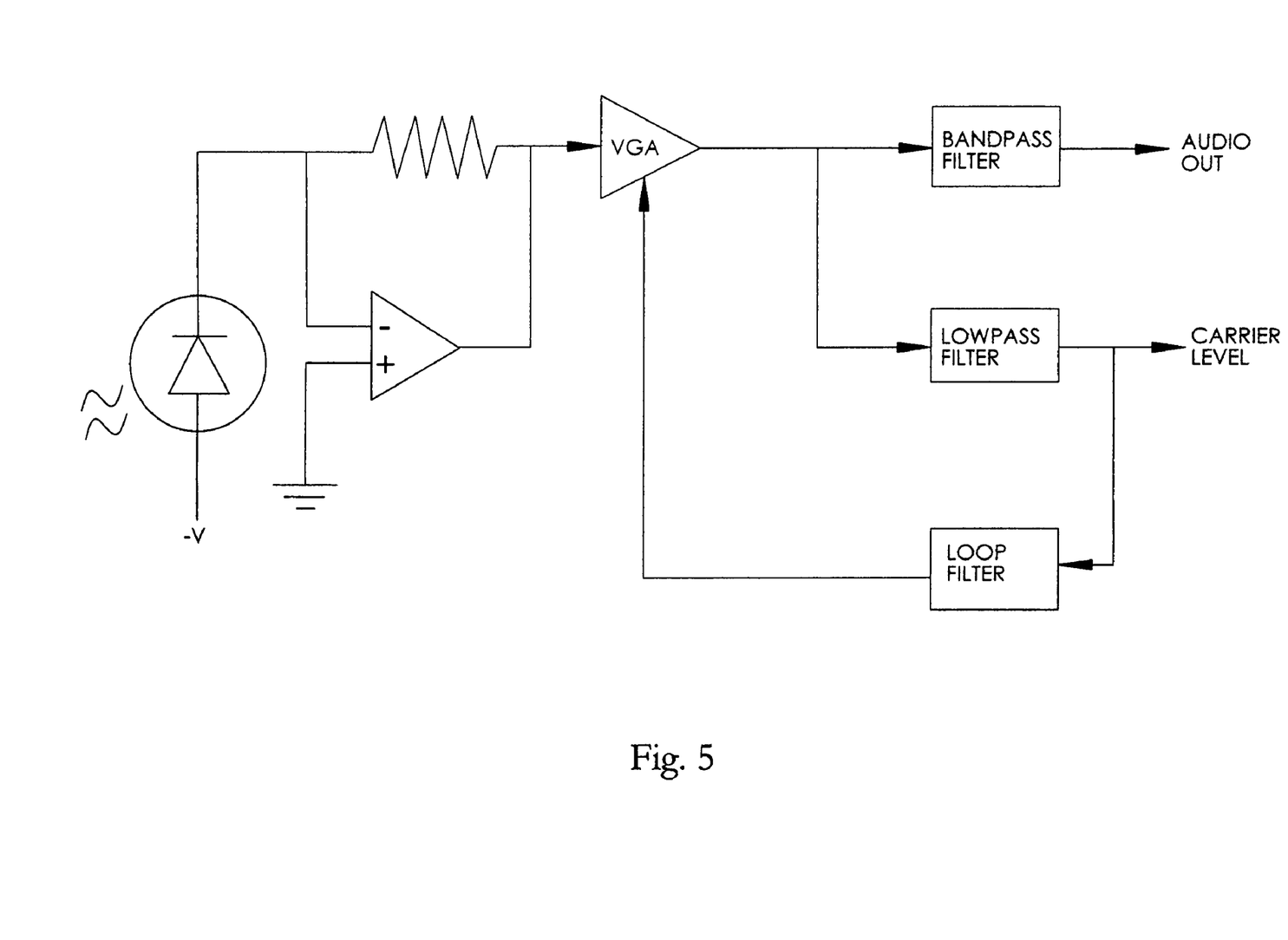
FIG. 5 shows a block diagram of a feedback turbulence suppression filter (12) that may be used in desired embodiments of the Passive Long Range Acoustic Sensor.
Figure 6:
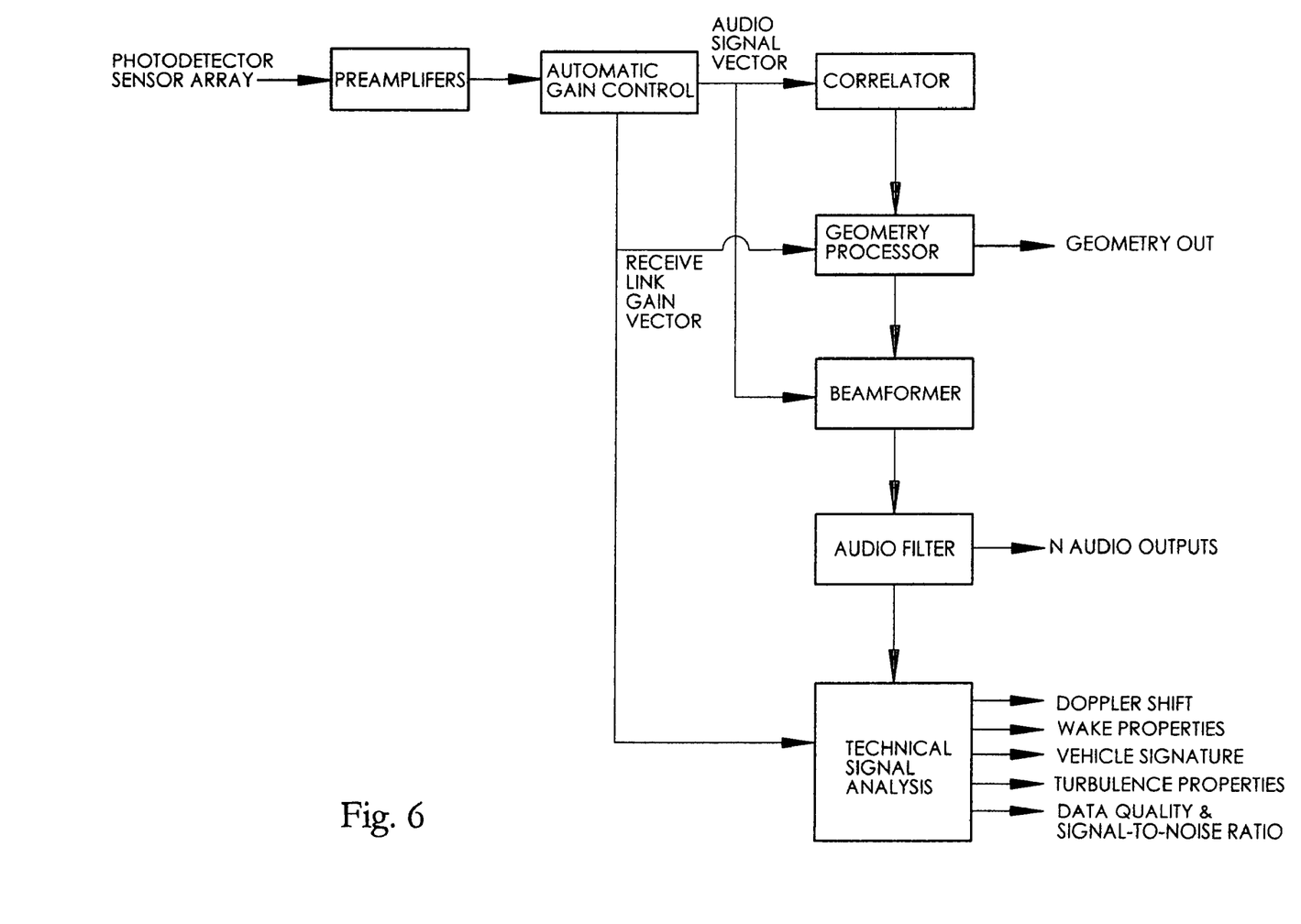
FIG. 6 shows a block diagram of a signal processing routine, shown in FIGS. 2, 3, and 7 as a computer (13) or the like, that may be used to process acoustical signals (5) from a multi-channel Passive Long Range Acoustic Sensor embodiment.

The feedforward filter (12) element, such as that shown in FIG. 4, generally performs better than the feedback filter (12) element, such as that shown in FIG. 5, for most viable designs and applications of the Passive Long Range Acoustic Sensor. An example of a signal processing routine for the Passive Long Range Acoustic Sensor is shown in FIG. 6, and said routine and variations thereof are represented throughout this specification and the appended drawing figures and claims, with a computer (13). This signal processing routine and variations thereof may be applied to any of the embodiments of the Sensor (7) invention, and is discussed further below. Throughout this specification and its appended claims, the term "computer" (13) is also intended to include signal analytical means (13), signal processing means (13), and other means of analyzing and mathematically or spectrally studying a signal or set of signals, such as, e.g., Doppler analysis.

Description of Multi-Channel Embodiments

The simplest multi-channel embodiment of the Passive Long Range Acoustic Sensor is a stereophonic embodiment. Remote stereophonic acoustical and sound sensing is possible by independently sensing and processing two spatially separated glints (8) associated with acousto-optical modulators (3). Multiple glints (8) associated with acousto-optical modulators (3) occur naturally and frequently as a result of arrays of building windows or rows of vehicles and their windshields, in a parking lot. Either a pair of telescopes (9) or the like can be used with independent photosensitive elements (10) for each Passive Long Range Acoustic Sensor, or alternatively, a single telescope (9) or the like can be used with a pair of spatially sensitive photosensitive elements (10) at the focal plane of the telescope (9). A quadrant photodiode or a more sensitive quadrant avalanche photodiode (APD) (10) with four discrete pixels or duolateral photodiodes (10) providing bulk resistive position sorting are suitable as the photosensitive element (10) for a simple stereophonic embodiment of the Passive Long Range Acoustic Sensor.

There are a number of significant advantages in using these new and useful stereophonic and multi-channel embodiments. Such advantages include, for example, an increased set of acoustical data for signal processing, an increased ability to discern noises that may then be filtered out of the signals, an increased ability to ascertain events and phenomena in the vicinity of the acoustical sensing, and a variety of beam-forming applications.

FIG. 6 illustrates a representative signal processor for a Sensor (7) array with two or more channels, making the Sensor (7) stereophonic or multi-channel. This signal processor would typically include the analog front end, followed by a digital signal processing computer, field programmable gate array, application-specific integrated circuit (ASIC) or similar high speed digital processor. The photosensitive element (10) array is either a multi-element photosensor (10) with individual outputs or, for larger arrays a multiplexed photosensor (10) such as a video or similar high speed electronic or film-based camera, with a sample rate that provides adequate sampling to meet Nyquist criteria. The photosensitive element (10) array output is first amplified to increase the signal level for subsequent processing. Each photosensitive element's (10) channel is passed through a separate automatic gain control (AGC) stage using the previously described feedforward or feedback filter topologies. Each AGC stage provides both a gain stabilized audio signal and the channel gain measurement. The audio signals are passed to a correlator array that forms temporal cross-correlations between the different sensor channels. The correlator outputs peak when the time lags to the acoustic source are matched. In other words, the correlator identifies the time lags required to match the acoustic time delays between the photosensitive elements (10) that will maximize the acoustic signal strength.

The Sensor's (7) correlator outputs are cross correlated and correspond to the acousto-optical modulator's (3) differential acoustic time delays to the various acoustic sources (5). This information is passed to a geometry processor which selects the lags for properly focusing the acoustic beam former, and extracting the scene geometry in the vicinity of the acousto-optical modulators (3). In the simplest case of a single sound source, the strongest correlator lags are simply passed to the beam former. Multiple spatially separated sound sources (5) can be separated by filtration prior to correlation. With moving sound sources, it is possible to infer the geometry of the acoustic emitters and acousto-optical modulators (3).

The geometry processor sets the time delays and summation weights for the acoustic beam former. The acoustic beam former coherently combines the optical detector outputs to produce one or more beam formed audio outputs. Internally, the beam former consists of a series of programmable time delay elements and summers. The time delay elements time align the audio signals which are then coherently summed. The beam former can simultaneously produce several acoustic beams corresponding to different acoustic sources (5). Alternately, the beam former can be used to produce a null in the direction of an interfering acoustic source.

The beam formed audio channels are then passed to audio bandpass filters to reduce turbulence induced noise and other interference sources. At this point, the recovered audio sources can be listened to, recorded and otherwise exploited.

A technical analysis of the multichannel audio and sensor AGC signals can be further processed to extract a variety of parameters. AGC signal variances provide a measure of the intervening atmospheric path optical properties as well as acousto-optical modulator (3) properties such as acousto-optical modulator (3) area. Motion of the acoustic source (5) can be extracted from Doppler frequency shifts. Different Doppler shifts from different acousto-optical modulator's (3) can be used to determine the trajectory of the acoustic source (5). Spectral signatures can be used to identify vehicles and other sound sources (5). For example, explosive events such as gunshots produce distinct spectral signatures, helping to help identify particular weapons.

As indicated above, often the telescope (9) field of view may include several independent spatially separated glints (8) and their associated acousto-optical modulators (3), such as a plurality of building window glints (8) or a plurality of automobile windshield glints (8), for example, as often found in a parking lot. Each glint (bright specular reflection) (8) corresponds to an independent acousto-optical modulator (3), that transduces the local acoustical sounds to an independent remote optical receiver link (6) or channel. Long distance multi-channel listening is possible by sensing using a plurality of spatially separated glints (8) associated with their acousto-optical modulators (3), which are separately received by this embodiment of the Passive Long Range Acoustic Sensor. This multi-channel embodiment of the Passive Long Range Acoustic Sensor, with a signal processor such as that illustrated in FIG. 6. Multi-channel acoustic reception may use an array of acousto-optical modulators (3) to transducer the acoustical sounds to a set of remote optical receiver links (6), one such link (6) or channel for each sensed acousto-optical modulator (3). Either a plurality of telescopes (9) or the like can be used with independent photosensitive elements (10) in this multi-channel embodiment of the Passive Long Range Acoustic Sensor, or alternatively, a single telescope (9) or the like can be used with a plurality of spatially sensitive photosensitive elements (10), such as an APD (10), at the focal plane of the telescope (9). The acoustic sources are time varying and the acousto-optical modulator's (3) geometry can be inferred from temporal cross correlations and Dopper shift measurements to determine velocity and related characteristics. Adaptive beam forming for signal enhancement and interference nulling is possible when the geometry is known and multiple glints (8) can be independently processed. An example of interference nulling or noise subtraction is shown in FIG. 9, where an outside noise channel may be subtracted from an outside plus inside acoustical channel to achieve an inside acoustical channel, representing a signal for inside a room of a building. Multi-channel embodiments of the Sensor (7) that are suitable for acoustic specular (glint) (8) beam forming may use detection technologies, such as high frame rate video cameras (9), film camera (9), and photosensitive elements (10), such as quadrant Avalanche Photo Diode (APD) (10), photomultiplier tube sensors (10), or multi-anode photomultiplier tube sensors (10), or the like, or a combination thereof. Throughout this specification and its appended claims, film camera detection technologies, as stated above and elsewhere, are digitized by scanning the film into a computer system, and the digitized signal would then be processed as with the other digital detection technologies cited.

Each such photosensitive element (10) in this multi-channel embodiment of the Passive Long Range Acoustic Sensor provides audio corresponding to the sound field local to the acousto-optical modulators (3), that is degraded by the atmospheric optical scintillation intensity modulation. Time delay cross correlation between such photosensitive elements (10) will provide the differential acoustic time delays between the photosensitive elements (10). If the acousto-optical modulators' (3) locations are known a priori, and are suitably spatially distributed, the location of the acoustical source (5) can be quickly determined. If the acousto-optical modulators' (3) locations are unknown and the acoustical source (5) is moving, it is possible to simultaneously solve for the locations of both the acousto-optical modulators (3) and the acoustical source (5). This is also a significant set of advantages of the new and useful multi-channel embodiments of the Passive Long Range Acoustic Sensor.

In short, there are several sets of multi-channel embodiments of the Passive Long Range Acoustic Sensor, and include, but are not limited to the following sets.

A first set of multi-channel Passive Long Range Acoustic Sensors may be comprised essentially of a telescope (9) with a plurality of photosensitive elements (10) positioned at said telescope's (9) focal plane. Each photosensitive element (10) is in communication with an independent amplifier (11), and each said independent amplifier (11) is in communication with a filter (12), typically a high pass filter (12). Each said filter (12) is in communication with a listening means (1 8), a recording means (19), an analytical means (13), or signal processing means (13), or a combination thereof.

A second set of multi-channel Passive Long Range Acoustic Sensors may be comprised essentially of a telescope (9) with a plurality of photosensitive elements (10) positioned at said telescope's (9) focal plane. Said plurality of photosensitive elements (10) are in multiplexed communication with an amplifier (11), and said amplifier (11) is in multiplexed communication with a filter (12), typically a high pass filter (12). Said filter (12) is in communication with a listening means (18), a recording means (19), an analytical means (13), or signal processing means (13), or a combination thereof.

A third set of multi-channel Passive Long Range Acoustic Sensors may be comprised essentially of a telescope (9) with a plurality of photosensitive elements (10) positioned at said telescope's (9) focal plane. One or more of said photosensitive elements (10) are in multiplexed communication with an amplifier (11), while the remainder of the photosensitive elements (10) are in communication with their own independent amplifier (11). One or more of said amplifiers (11) are in multiplexed communication with a filter (12), typically a high pass filter (12), while the remainder of amplifiers (11) are in communication with their own independent filter (12). The set of filters (12) are in communication with a listening means (18), a recording means (19), an analytical means (13), or a signal processing means (13), or a combination thereof.

A fourth set of multi-channel Passive Long Range Acoustic Sensors may be comprised essentially of a telescope (9) with a plurality of photosensitive elements (10) positioned at said telescope's (9) focal plane. One or more of said photosensitive elements (10) are in multiplexed communication with an amplifier (11), while the remainder of the photosensitive elements (10) are in communication with their own independent amplifier (11). The amplifiers (11), and each of them, are in communication with a filter (12), typically a high pass filter (12). The filter (12) is in communication with a listening means (18), a recording means (19), an analytical means (13), or a signal processing means (13), or a combination thereof.

A fifth set of multi-channel Passive Long Range Acoustic Sensors may be comprised essentially of a telescope (9) with a plurality of photosensitive elements (10) positioned at said telescope's (9) focal plane. The photosensitive elements (10) are in multiplexed communication with an amplifier (11), and said amplifier (11) is in multiplexed communication with a plurality of filters (12), typically high pass filters (12). The set of filters (12) are in communication with a listening means (18), a recording means (19), an analytic means (13), or a signal processing means (13), or a combination thereof.

A sixth set of multi-channel Passive Long Range Acoustic Sensors may be comprised essentially of a plurality of Passive Long Range Acoustic Sensors (7), and such that each of said plurality of Passive Long Range Acoustic Sensors (7) being in communication with listening means (18), a recording means (19), an analytic means (13), a common signal processing computer (13) or the like, or a combination thereof.

Description of a Hybrid Passive/Active Embodiment

Figure 7:
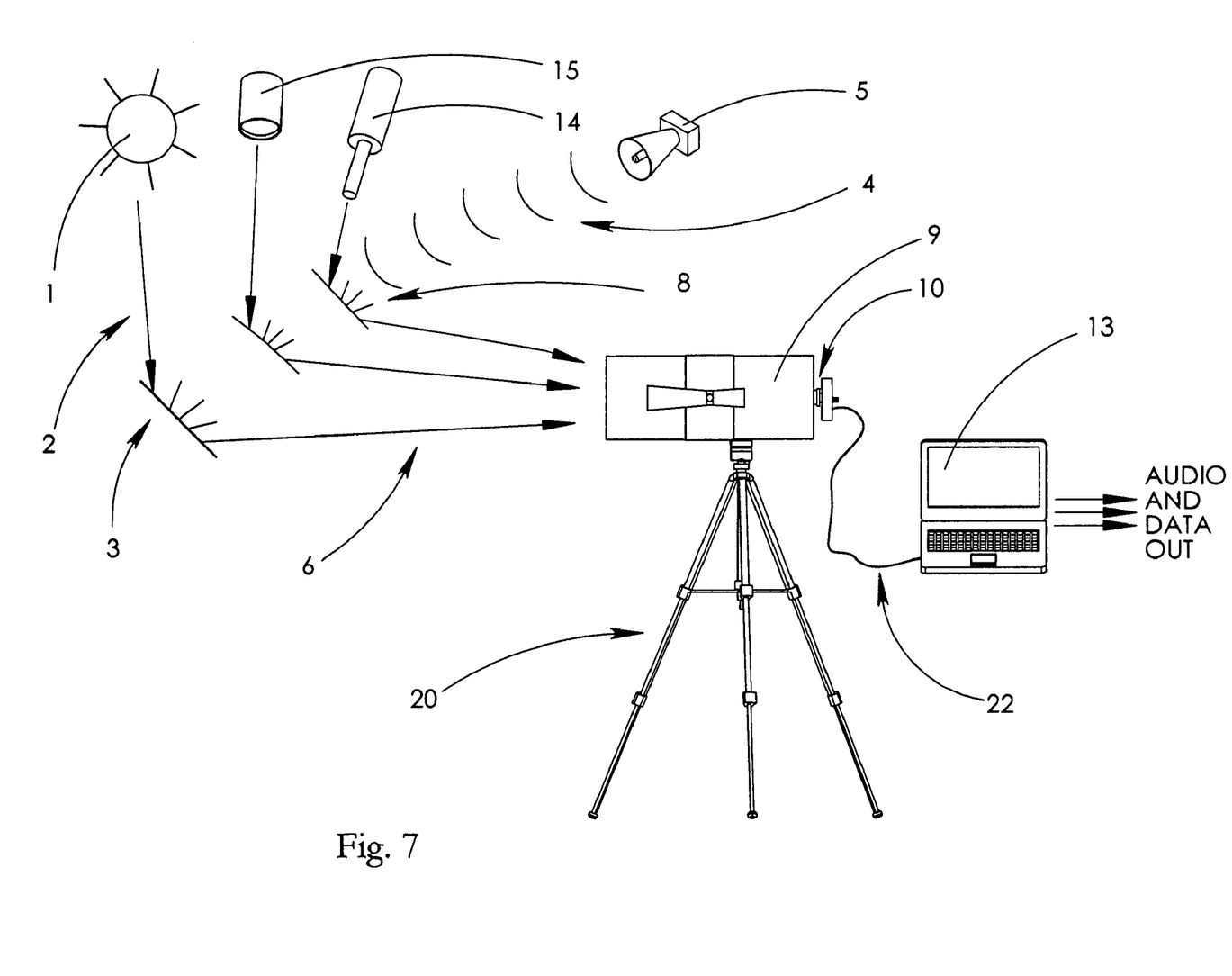
FIG. 7 shows a left side view of a hybrid embodiment of a multi-channel Passive/Active Long Range Acoustic Sensor, where one or more of the glints (8) are naturally illuminated, and one or more of the other glints (8) are created by artificial illumination means by laser (14) or by artificial light means, such as a spotlight (15), strobe, lamp, or other artificial means, or by a combination of artificial lighting means thereof.

Hybrid embodiments of the Passive/Active Long Range Acoustic Sensor may include a combination of passive, solar optical illumination sources (1) for illuminating acousto-optical modulators (3) with glints (8), and in combination with artificial illumination sources (1), such as by one or more bright spotlights (15) or lasers (14), or both. An example of such a hybrid multi-channel embodiment of this Passive/Active Long Range Acoustic Sensor is shown in FIG. 7.

Another set of hybrid Passive and Passive/Active Long Range Acoustic Sensor embodiments includes one or more Sensors (7) and artificial illumination sources such as spotlights (15) and lasers (14) mounted on observation vehicles and devices, such as observational balloons, unmanned aerial vehicles (AUVs, also known as drones) (16), helicopters, piloted planes and the like. Such hybrid embodiments may have one or more Sensors (7) mounted on the observational vehicle (16) or device so that the Sensors (7) might be aimed and remain aimed, for example by electromechanical means, at one or more glints (8) for sufficient time to obtain desired information. Such hybrid embodiments may optionally include artificial illumination sources, such as one or more bright spotlights (15) or lasers (14), or a combination thereof. This hybrid embodiment of the Sensor (7) may utilize a Sensor-to-computer transmitter (17) to transmit data from a remote Sensor (7) to a computer (13) or the like. An example of such a hybrid Passive and Passive/Active Long Range Acoustic Sensor mounted on an AUV (16) is shown in FIG. 8.

Some specialized and hybrid embodiments of the Passive Long Range Acoustic Sensor may utilize a plurality of filters (12), as disclosed above, and said plurality of filters (12) may include filters (12) with feedback filter (12) architectures, as well as filters (12) with feedforward filter (12) architectures.

Additional Embodiments of the Invention

Other embodiments of the Passive Long Range Acoustic Sensor may also include kits, including partially assembled kit embodiments, which are comprised essentially of selected components utilized in the various above-described embodiments of the Passive Long Range Acoustic Sensor, but are packaged and marketed as a kit or the like, to be a stand alone Sensor, or as an element or component of a set of sensors or devices.

Other embodiments of the invention may include the methods disclosed throughout this specification and as follows, to extract or analyze a signal in a remote optical receiver link (6), from the glint (8) associated with an acousto-optical modulator (3). Such a method for passively sensing remote acoustical sounds (5) may be comprised essentially of the following steps:
  a. aligning a telescope (9) so that a remote glint (8) is viewed and sensed by a photosensitive element (10) located at said telescope's (9) focal plane;
  b. amplifying (11) a signal generated by said photosensitive element (10);
  c. filtering (12) said signal with a high pass filter (12), and
  d. transmitting the signal to a listening means (18), recording means (19), analytical means (13), or signal processing means (13), or a combination thereof.

Another method for passively sensing remote acoustical sounds, may be comprised essentially of the above four steps and further comprised of additional photosensitive elements (10) located at the focal plane of the telescope (9), to allow simultaneous viewing and sensing of multiple remote glints (8), amplifying (11) each said photosensitive elements' (10) signal, and filtering (12) each of the photosensitive elements' amplified (11) signal with a high pass filter (12), and transmitting each said photosensitive elements' amplified (11) and filtered (12) signal to a listening means (18), recording means (19), analytical means (13), or signal processing means (13), or a combination thereof.

While I have shown and described in this disclosure and its appended drawing figures, and which are a part of and incorporated in said disclosure, only selected embodiments in accordance with the present invention, it is understood that the same is not limited thereto, but is susceptible to numerous changes and modifications as known to one having ordinary skill in the art, and I therefore do not wish to be limited to the details shown and described herein, but intend to cover all such modifications, changes, eliminations, combinations, and hybrids, as are encompassed by the scope of the appended claims.

I claim:

1. A Passive Long Range Acoustical Sensor, comprised essentially of:
   a. a telescope with a photosensitive element positioned at said telescope's focal plane;
   b. said photosensitive element is in communication with an amplifier;
   c. said amplifier is in communication with a DC coupled automatic gain control that stabilizes a DC gain from an optical communication channel;
   d. and the amplifier is in communication with a band pass filter that passes a desired audio signal; and
   e. said band pass filter is in communication with a listening means.

2. A Passive Long Range Acoustic Sensor, comprised essentially of that recited in claim 1, and further comprised of a recording means that is also in communication with the band pass filter.

3. A Passive Long Range Acoustic Sensor, comprised essentially of that recited in claim 1, and further comprised essentially of:
   a. additional photosensitive elements, each said additional photosensitive elements capable of sensing a set of different glints in a scene, and being in communication with an additional amplifier;
   b. each said additional amplifier being in communication with an additional DC coupled automatic gain control;
   c. each said additional DC coupled automatic gain control being in communication with an additional band pass filter;
   d. and each said additional band pass filter is in communication with said listening means.

4. A Passive Long Range Acoustic Sensor, comprised essentially of that recited in claim 1, and further comprised essentially of an additional photosensitive element, with the photosensitive element and said additional photosensitive element each sensing a spatially separated glint, and said photosensitive element and the additional photosensitive element each being in multiplexed communication with said amplifier, said DC coupled automatic gain control and the band pass filter, and such that said band pass filter is in communication with a stereophonic listening means.

5. A Passive Long Range Acoustic Sensor, comprised essentially of that recited in claim 3, wherein a plurality of band pass filter outputs are connected to a correlator that computes differential acoustic path delays from intensity variation of said set of different glints in a scene for at least one acoustic source.

6. A Passive Long Range Acoustic Sensor, comprised essentially of that recited in claim 1, wherein said automatic gain control uses a feedback gain stabilizing architecture.

7. A Passive Long Range Acoustic Sensor, comprised essentially of that recited in claim 1, wherein said automatic gain control uses a feedforward gain stabilizing architecture.

8. A Passive Long Range Acoustic Sensor; comprised essentially of that recited in claim 3, and further comprised of a correlator that computes differential acoustic path delays from intensity variations of said set of different glints, and for at least one acoustic source.

9. A Passive Long Range Acoustic Sensor, comprised essentially of that recited in claim 8, wherein said correlator is in communication with a programmable time delay system, and said programmable time delay system can time align a set of acoustic paths from said acoustic source to said the set of different glints to cause coherent enhancement of a desired acoustic source.

10. A Passive Long Range Acoustic Sensor, comprised essentially of that recited in claim 8, wherein said correlator is in communication with a programmable time delay system, and said programmable time delay system can time align a set of acoustic paths from said acoustic source to said the set of different glints to cause coherent cancellation of an interfering acoustic source.

11. A Passive Long Range Acoustic Sensor, comprised essentially of:
   a. a telescope with a plurality of photosensitive elements positioned at said telescope's focal plane;
   b. said plurality of photosensitive elements are capable of sensing multiple spatially separated glints, and each of the plurality of photosensitive elements are in multiplexed communication with an amplifier;

c. said amplifier is in communication with a multiplexed band pass filter;

d. said band pass filter is in communication with a correlator that computes differential acoustic path lengths from intensity variations of a set of spatially separated glints and for at least one acoustic source.

12. A Passive Long Range Acoustic Sensor, comprised essentially of that recited in claim 11, with said correlator in communication with a Programmable time delay system, wherein said programmable time delay system can time align a set of acoustic oaths from said acoustic source to said set of spatially separated glints to cause coherent enhancement of the acoustic source, followed by a multichannel recording means.

13. A Passive Long Range Acoustic Sensor, comprised essentially of that recited in claim 11, and further comprised essentially of:

a. additional photosensitive elements, with each said additional photosensitive element being in communication with an additional amplifier;

b. and each said additional amplifier being in communication with an additional filter;

c. and each said additional filter being in communication with the correlator.

14. A Passive Long Range Acoustic Sensor, comprised essentially of that recited in claim 13, wherein the amplifier and each additional amplifier is followed by an optical carrier referenced gain stabilizing feedback architecture.

15. A Passive Long Range Acoustic Sensor, comprised essentially of that recited in claim 11, wherein the amplifier is followed by an optical carrier referenced gain stabilizing feedback architecture.

16. A Passive Long Range Acoustic Sensor, comprised essentially of that recited in claim 13, wherein the amplifier and each additional amplifier is followed by an optical carrier referenced gain stabilizing feedforward architecture.

17. A Passive Long Range Acoustic Sensor, comprised essentially of that recited in claim 11, wherein the amplifier is followed by an optical carrier referenced gain stabilizing feedforward architecture.

18. A Passive Long Range Acoustic Sensor System, comprised essentially of a plurality of the Passive Long Range Sensors as recited in claim 1, and such that each of said plurality of the Passive Long Range Sensors are sensing a spatially separated glint, and each of the plurality of Passive Long Range Acoustic Sensors being in communication with a common signal processing computer that includes a correlator that computes differential acoustic path delays from the intensities of said spatially separated glints for at least one acoustic source.

19. A method for passively sensing remote acoustical sounds, comprised essentially of the steps of:

a. aligning a telescope so that a remote glint is viewed and sensed by a photosensitive element located at said telescope's focal plane;

b. amplifying a signal generated by said photosensitive element;

c. reducing low frequency amplitude noise modification by stabilizing a glint channel gain with a DC coupled automatic gain control;

d. filtering said signal with an audio band pass filter, and e. transmitting the signal to a listening means.

20. A method for passively sensing remote acoustical sounds, comprised essentially of the steps recited in claim 19, and further comprised of additional photosensitive elements located at the focal plane of the telescope, to allow viewing and sensing of multiple remote glints, amplifying each said photosensitive element's signal, stabilizing said glint channel gain with a DC coupled automatic gain control, and filtering each of the photosensitive element's amplified signal with a band pass filter, and transmitting each said photosensitive element's amplified and filtered signal to a listening means.

* * * * *